(12) United States Patent
Milazzotto et al.

(10) Patent No.: US 6,256,211 B1
(45) Date of Patent: Jul. 3, 2001

(54) CIRCUIT DEVICE FOR DRIVING AN A.C. ELECTRIC LOAD

(75) Inventors: Antonino Milazzotto, Rodano; Mario Di Guardo, Gravina Di Catania; Antonino Cucuccio; Nicola Nicosia, both of Catania, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/476,489

(22) Filed: Dec. 30, 1999

(30) Foreign Application Priority Data

Dec. 31, 1998 (EP) .................................................. 98830809

(51) Int. Cl.⁷ ...................................................... H02M 1/12
(52) U.S. Cl. ............................................... 363/39; 363/37
(58) Field of Search .................................. 363/34, 37, 39, 363/40, 41, 132; 323/239

(56) References Cited

U.S. PATENT DOCUMENTS 5,563,487 * 10/1996 Davis ..................................... 318/701
6,069,810 * 5/2000 Wissmach et al. .................. 363/132

FOREIGN PATENT DOCUMENTS 0 221 574 A2   5/1987  (EP) .
0 573 197 A1  12/1993  (EP) .

* cited by examiner

Primary Examiner—Jessica Han
(74) Attorney, Agent, or Firm—Theodore E. Galanthay; Robert Iannucci; Seed IP Law Group, PLLC

(57) ABSTRACT

Presented is a circuit device for driving an a.c. electric load, incorporating a rectifying bridge that has a first input connected to one terminal of the electric load and a second input connected to an outlet of an a.c. main supply. The rectifying bridge has output terminals connected to a power switch which is controlled by an electric signal. The circuit device has a circuit loop-back link connected in parallel to the electric load, and a second circuit loop-back link connected in parallel to the electric load. The first and second links are alternately activated by the positive and negative half-waves of the main supply when the switch is in its "off" state.

19 Claims, 7 Drawing Sheets

CIRCUIT DEVICE FOR DRIVING AN A.C. ELECTRIC LOAD

TECHNICAL FIELD

This invention relates to a circuit device for driving an a.c. electric load, and more particularly, to a device of a type incorporating a rectifying bridge which has a first input connected to one terminal of the electric load and a second input connected to an outlet of an a.c. main supply.

BACKGROUND OF THE INVENTION

The simplest way of varying the supply voltage to an electric motor, or resistive/inductive load, is that of using a Triac device effective to partialize the main voltage being applied to the motor. This technique is cost-efficient, but has a problem in that it introduces harmonics in the current waveform of the main supply.

Stringent European standards have set restrictions on the harmonic contents of main current, and today's trend favors the use of circuit devices based on bridge structures which produce PWM (Pulse Width Modulation) signals and are less prone to introduce harmonics.

Several types of drive circuits for a.c. motors are known from the literature. These circuit types use basically d.c./a.c. switches with inverters, whereby a sinusoidal voltage is output which can be varied in amplitude and frequency in quite an independent manner. All these conventional type circuits are based on bridge circuits producing PWM signals.

The d.c. voltage is obtained by rectifying and filtering the main supply voltage according to a scheme which is known per se and essentially as shown in FIG. 1 of the accompanying drawings.

A rectifier diode is connected in parallel to a filter capacitor, and to a switch having the electric motor, or another electric load such as a lamp or an electric oven, connected across it. These drive circuits have a drawback in that, additionally to introducing harmonics in the waveform of the main current, they incorporate fairly expensive components.

On the other hand, approaches based on the use of Triac devices lead to acoustic noise being generated by d.c. motors, when such motors are regulated by phase partializing. Such is the case with kitchen hoods, for example, where this technique is often used for supplying and driving the suction fans for cost reasons.

The higher order harmonics thus produced cause metal parts and the magnetic circuits associated with the motor to vibrate, thereby producing a rattling noise which is objectionable by the house occupants.

For varying the voltage applied to an a.c. load, it has been proposed to drive electric motors by a partialized main voltage sinusoid, as achieved by controlling the conduction angle of a thyristor. In this way, the voltage at the load is made to depend on the turn-on angle alpha of the thyristor. However, not even this method can solve the problem of harmonics appearing on the main current.

SUMMARY OF THE INVENTION

Embodiments of the invention provide a circuit device for driving a.c. loads, which have constructional and functional features such that the load can be connected directly to the a.c. supply line, thus drastically reducing the probability of current harmonics being introduced on the supply line, and overcoming the limitations and drawbacks of available prior art solutions.

The embodiments of the invention provide a double bi-directional loop-back link connected in parallel to the electric load. Advantageously, the first and second links are activated alternately by the positive and negative half-waves of the main supply when the switch is in the "off" state.

Presented is a circuit device for driving an a.c. electric load, incorporating a rectifying bridge that has a first input connected to one terminal of the electric load and a second input connected to an outlet of an a.c. main supply. The rectifying bridge has output terminals connected to a power switch which is controlled by an electric signal. The circuit device has a circuit loop-back link connected in parallel to the electric load, and a second circuit loop-back link connected in parallel to the electric load. The first and second links are alternately activated by the positive and negative half-waves of the main supply when the switch is in its "off" state.

The features and advantages of a device according to the invention will be apparent from the following description of an embodiment thereof, given by way of non-limitative example with reference to the accompanying drawings.

BRIEF DESCRIPTION OF THE DRAWINGS

FIG. 4A is drawn on the same time base as FIG. 4 to illustrates the reversal of the main negative half-wave as obtained through a circuit portion of the device shown in FIG. 2.

DETAILED DESCRIPTION

Figure 1:
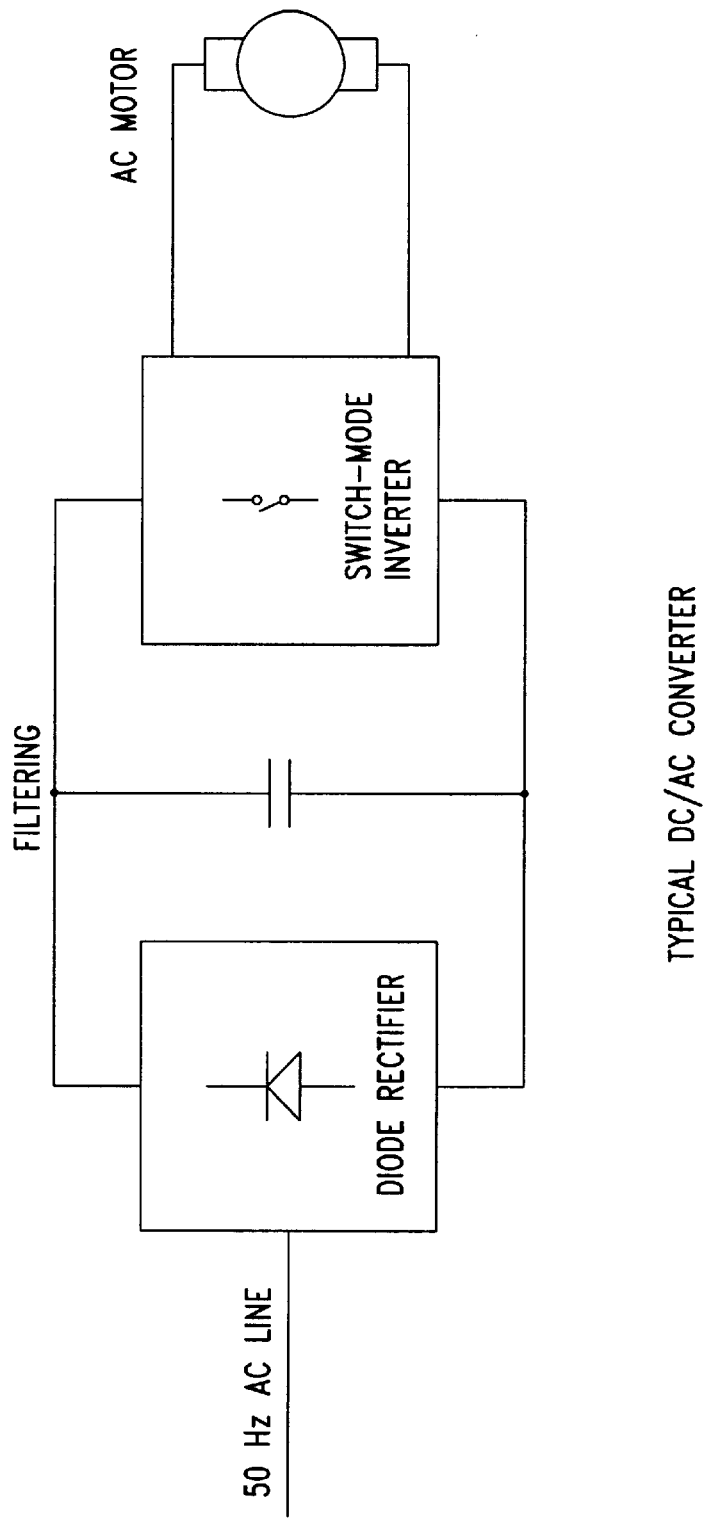
FIG. 1 is a schematic view of an electric load driver according to the prior art.
Figure 2:
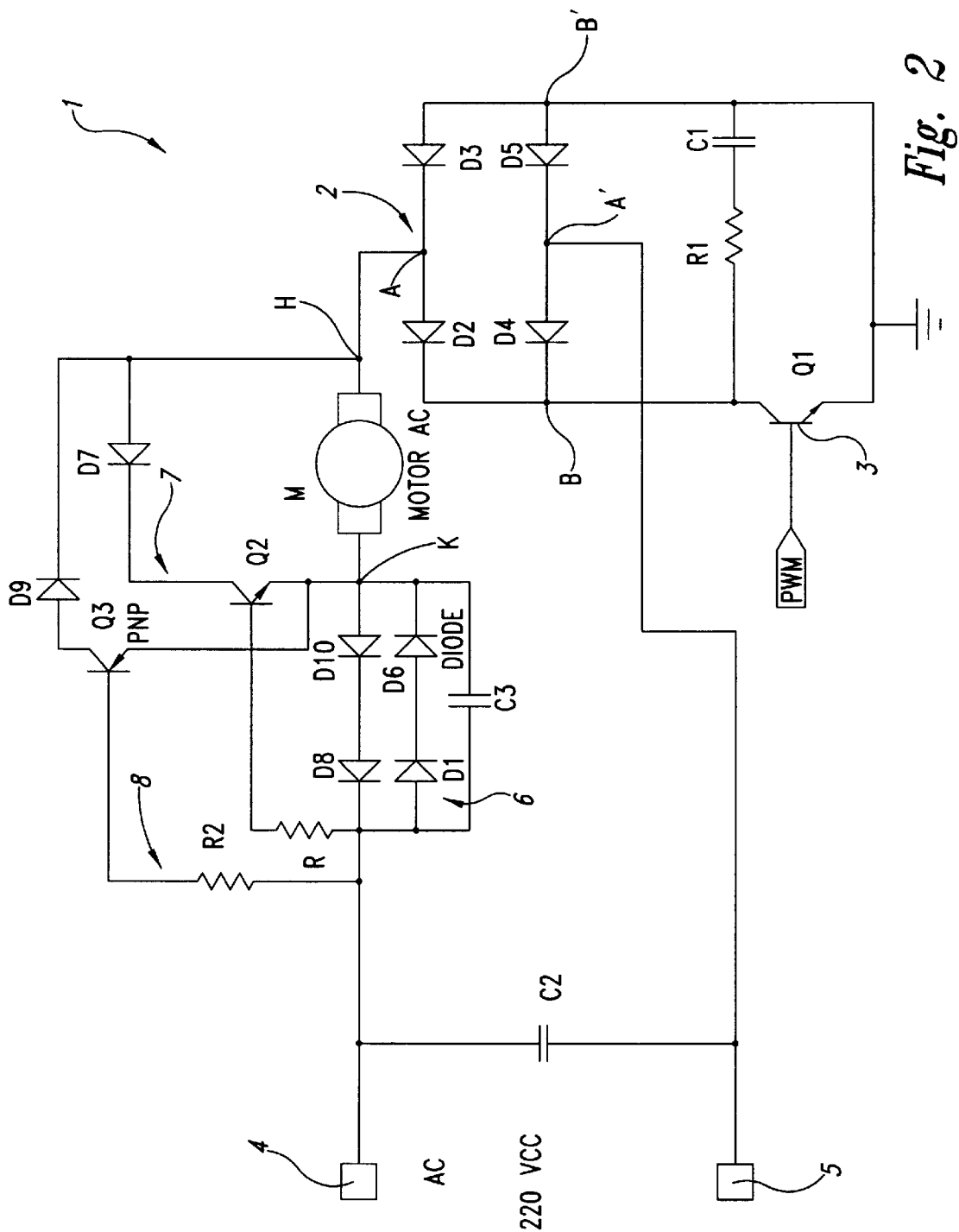
FIG. 2 is a schematic view of a circuit device according to an embodiment of the invention.

Referring specifically to FIG. 2 of the drawings, generally and schematically shown at 1 is a circuit device according to an embodiment of the invention for driving electric loads M which are supplied an a.c. Current.

These loads could be electric motors, or electric apparatus of any other types presenting a resistive/inductive load and to be driven by varying the main supply voltage.

The a.c. Main supply, which can be 220v, 110v, or any a.c. Power supply voltage, is represented by a pair of outlets 4, 5 having a filtering capacitor Co. Connected across them.

The circuit device of this embodiment includes a bridge type of rectifying structure 2 which is connected between the main outlet 5 and the electric load M. In particular, the bridge 2 has two input terminals A, A' and two output terminals B, B'. Preferably, the bridge 2 comprises diodes Dr., De, Dr., and Dr.

The input terminal A is connected to a terminating node H of the electric load M, and the other terminal A' is connected to the main outlet 5.

The output B, B' of the bridge 2 is connected to an electronic switch 3 which is controlled by a signal PWM. Associated in parallel with the switch 3 is a series of a resistor R1 and a capacitor C1, which are connected between the output terminals B, B' of the bridge 2. A discrete bipolar transistor Q1, of the NPN power type, receives the signal PWM on its base terminal, and has its conduction terminals connected between the output terminal B of the bridge 2 and a ground reference supply GND.

The other output terminal B' is also taken to the ground reference GND.

This embodiment of the invention includes a bidirectional current loop-back arrangement which is controlled by the same current as is flowed through the inductive windings of the electric load M.

A double loop-back circuit link is provided in parallel with the electric load M. Specifically, a first component pair formed of a selection transistor Q2 and a diode D7, are arranged to form a first circuit link between the main outlet 4 and the nodes H, K at the input of the electric load M.

A second pair formed of a selection transistor Q3 and a diode D9 are arranged, according to the invention, to form a second circuit link 8 between the main outlet 4 and the nodes H, K at the electric load M input.

The first link 7 comprises the NPN bipolar transistor Q2, acting as a selector and having its base terminal connected to the main outlet 4 via a resistor R. The conduction, or collector and emitter, terminals of this transistor Q2 are connected to the node H of the load M, via a diode D7, and to the node K of the load M, respectively.

The second circuit link 8 comprises a bipolar transistor Q3, acting as a selector and having its base terminal connected to the main outlet 4 via a resistor R2. This transistor Q3 is a PNP transistor.

The conduction, or collector and emitter, terminals of the transistor Q3 are connected to the node K of the load M, and via a diode D9 to the node H of the load M, respectively.

Advantageously, the selection of the two diodes D7 and D9 is differentiated using the positive and negative half-waves of the main voltage signal.

The structure of the device 1 also comprises a double pair 6 of diodes D1, D6, D8 and D10, which diodes are connected in antiparallel and essentially connected between the bases and the emitters of both transistors Q2 and Q3. This double diode pair 6 is further connected between the main outlet 4 and the terminating input node K of the load M.

A capacitor C3 is connected between the input and the output of the double diode pair 6.

The operation of the circuit device according to the invention will now be described.

During the time period when the power transistor Q1 is brought to its "on" state, the load M is supplied the main voltage of, for example, 220V directly.

Upon the transistor Q1 being turned off, when it is acting as an open switch, the current would disappear at once, and the voltage might attain very high values at all the circuit nodes. In this circuit 1 this is prevented from occurring, however, by that the double loop-back link 7, 8 provided enables the current to flow bi-directionally and gradually from the opposite ends of the electric load M.

In particular, the first 7 and second 8 links connected in parallel to the electric load are alternately activated, according to whether the positive half-wave or the negative half-wave happens to be present on the supply line.

Perfect synchronization with the zero-crossing of the current flowing through the circuit is achieved. For the purpose, the voltage drop across the series of the two diodes, which are connected in series with the main link and forward biased, is utilized.

In fact, with an incoming current to the circuit, the voltage drop across the series of the diodes D1, D6 in the double pair 6 would be positive with respect to the emitters of both transistors Q2 and Q3. As a result, the transistor Q2 would be brought to its saturation range, and the transistor Q3 would be blocked.

The capacitor C3 is effective to filter the voltage drop of this series of diodes D1, D6, preventing the transistors from being turned off when the power switch 3 is turned off. Under this condition, the current is allowed to flow through the link comprised of the transistor Q2, diode D7 and load M.

On the other hand, with an outgoing current from the circuit, the voltage drop across the series of the diodes D8, D10 in the double pair 6 would be the opposite from the previous case, and force the transistor Q2 to the "off" state and the transistor Q3 to saturation.

Figure 3:
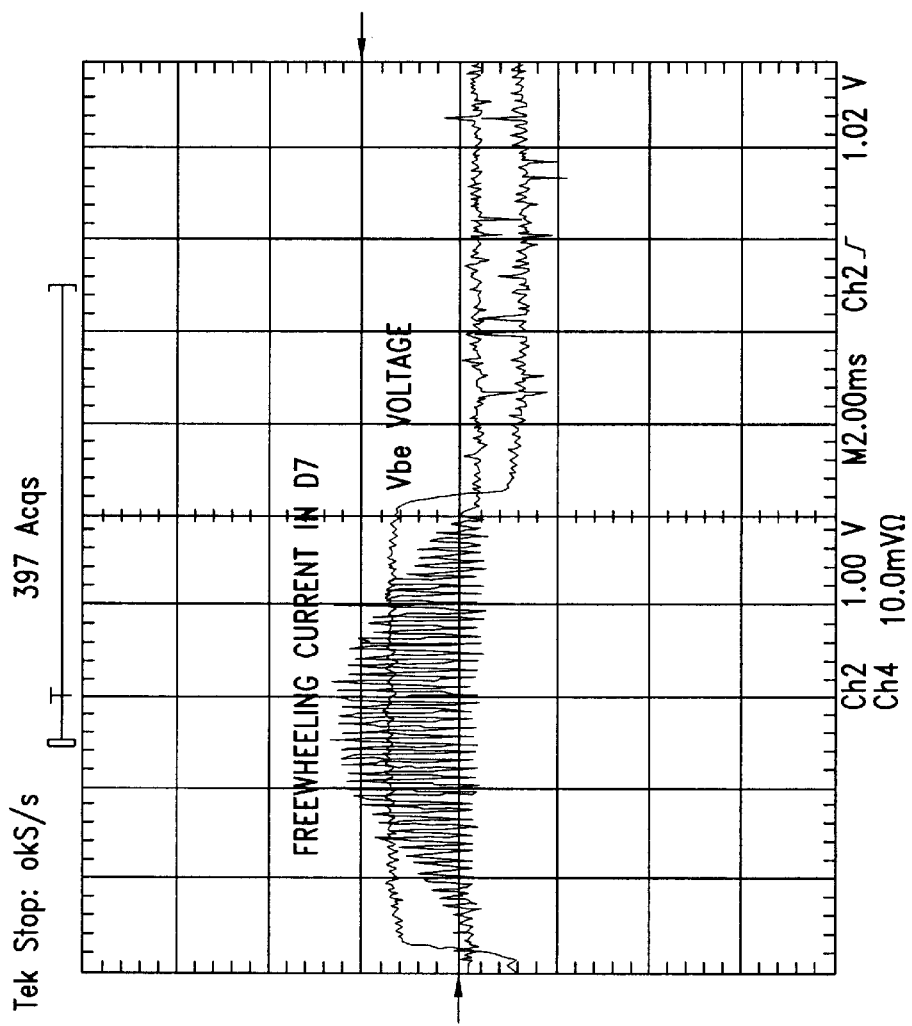
FIG. 3 is a voltage vs. time plot of the base-emitter voltage drop through a transistor incorporated in the device of FIG. 2.

FIG. 3 shows schematically a voltage vs. time plot of the base-emitter voltage drop through a full cycle of the main supply, and the corresponding change in the loop-back current during one of the main half-waves.

Figure 4:
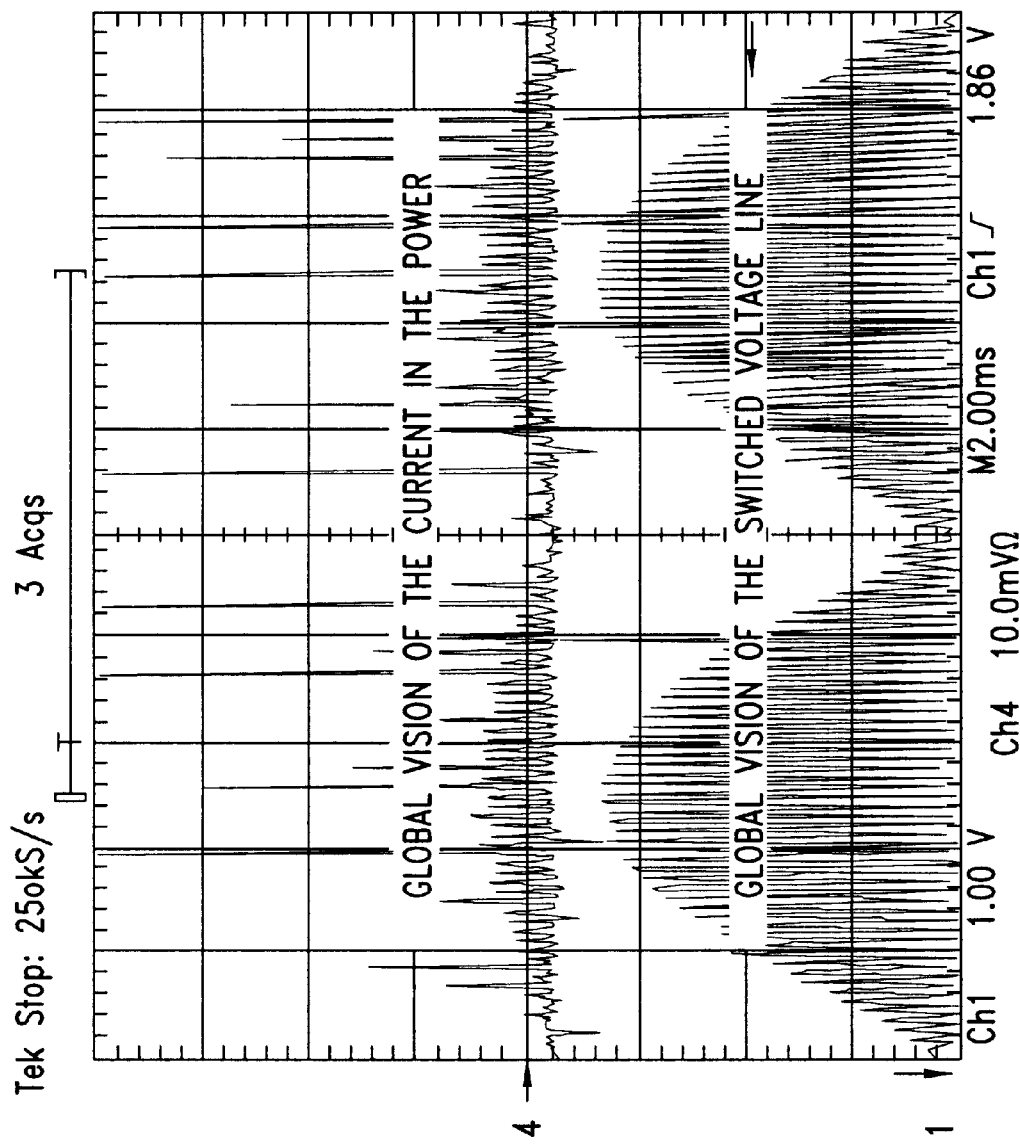
FIG. 4 illustrates the behavior of the current flowing through a power switch of the device of FIG. 2 during a full cycle of the main current.

Shown in FIG. 4 is the pattern of the current through the transistor Q1, over a full cycle of the main supply. In FIG. 4A, which has the same time base as FIG. 4, the reversal of the main negative half-wave, as provided by the rectifying bridge 2 formed of the diodes D2, D3, D4 and D5, is shown.

The series of the two diodes D1, D8 connected in antiparallel ensures saturation of the transistors even at low values of the current being flowed therethrough, and hence low operating power values of the load M.

The series of the resistor R1 and the capacitor C1, in parallel with the power switch 3, allows the overvoltage peaks to be kept low, along with the voltage differential and the voltage fluctuations in the upper region of the main sinusoid. The size of the components R2 and C2 will be selected at the designing stage to suit the type of the electric load and the type of the switch used.

Figure 5:
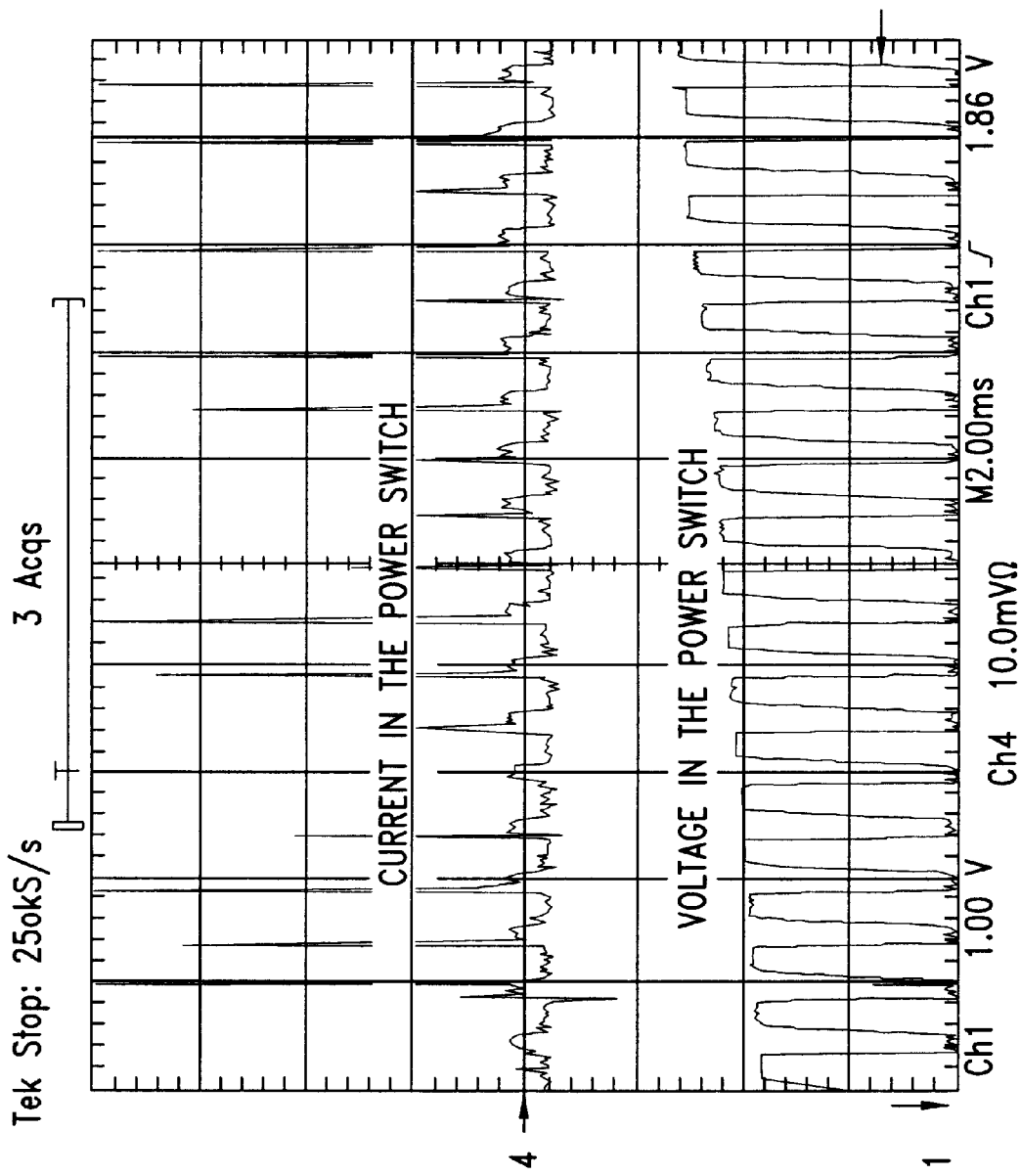
FIGS. 5 and, 5A is a graph showing the current and voltage patterns at the switch incorporated to the device in FIG. 2.

FIGS. 5 and 5A illustrate the patterns for the switch 3 current and voltage. As can be seen, the voltage peak has been well flattened in the upper region. This is made possible by the loop-back links provided by the invention.

FIG. 5A shows, in particular, the main sinusoid envelope.

In essence, a major advantage of the circuit 1 is that the overvoltage problems of the power switch 3 have now been significantly attenuated by the use of devices which can operate on a lower voltage, besides being more cost-efficient.

Figure 6:
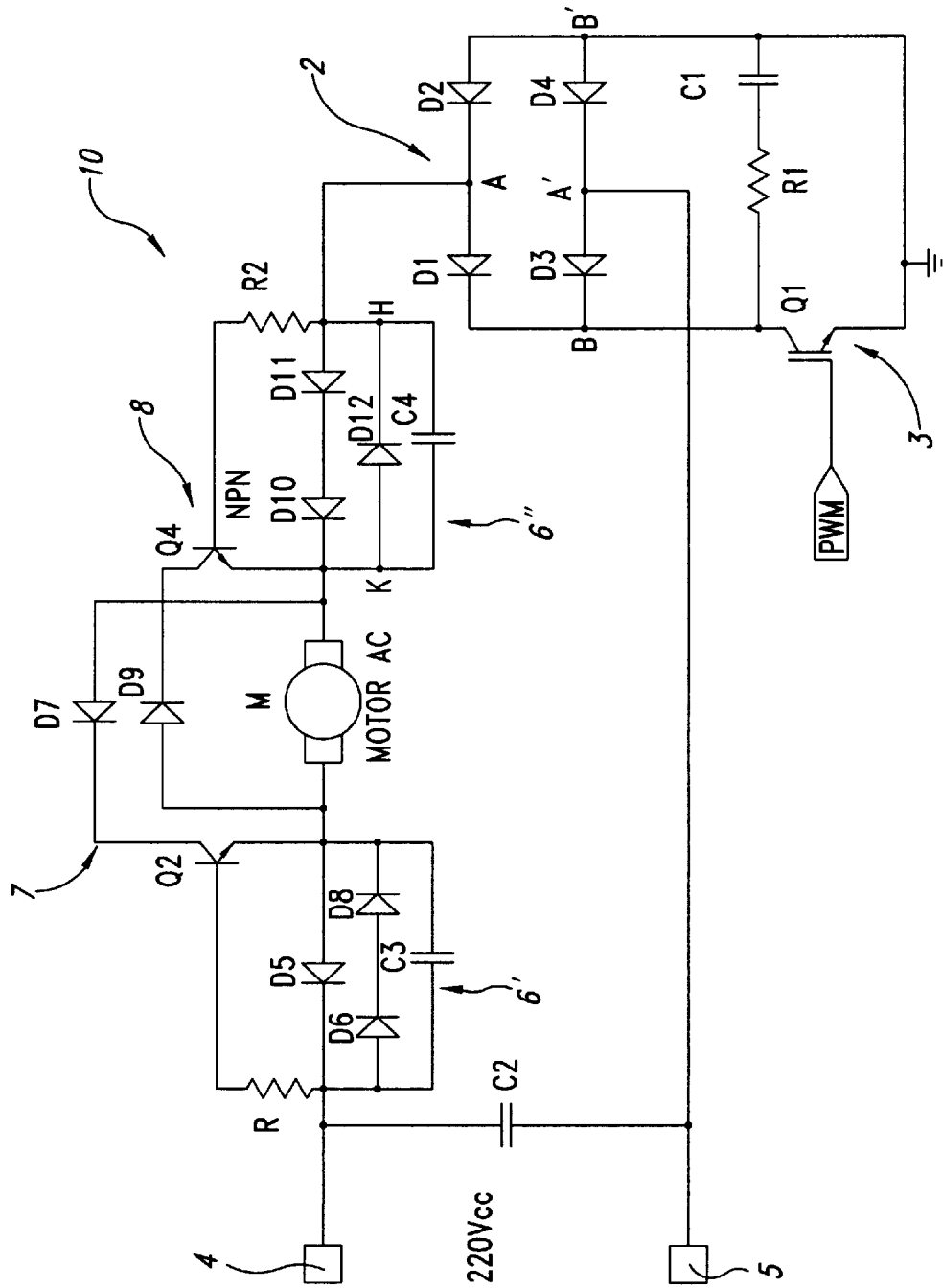
FIG. 6 is a schematic diagram of a modified embodiment of the inventive device.

Similar results are to be obtained with a second embodiment, depicted in FIG. 6, wherein an NPN bipolar transistor Q4 is substituted for the PNP transistor Q3 in the link 8. FIG. 6 shows schematically a modified embodiment, denoted by the numeral 10, of the circuit device 1 of FIG. 2.

In this embodiment, the second link 8 also includes an NPN transistor Q4. In this case, however, a different configuration is provided for that circuit portion which comprises the antiparallel diodes. In particular, two discrete portions 6', 6" are provided, each comprising a single diode and a series of two diodes connected in antiparallel to the single diode, as shown in FIG. 6.

During the positive half-wave, the voltage drop is positive with respect to the potential at the base of the transistor Q2. The voltage drop across the diode series D6, D8 is sufficient to bias the transistor Q2.

Under this condition, the current is allowed to flow through the diode D7 while the switch 3 is in the "off" state. The transistor Q3 is held blocked instead.

On the other hand, during the negative half-wave, the transistor Q2 is held blocked, and the transistor Q3 brought to the saturation range, enabling the diode D9 to loop back the current.

Figure 7:
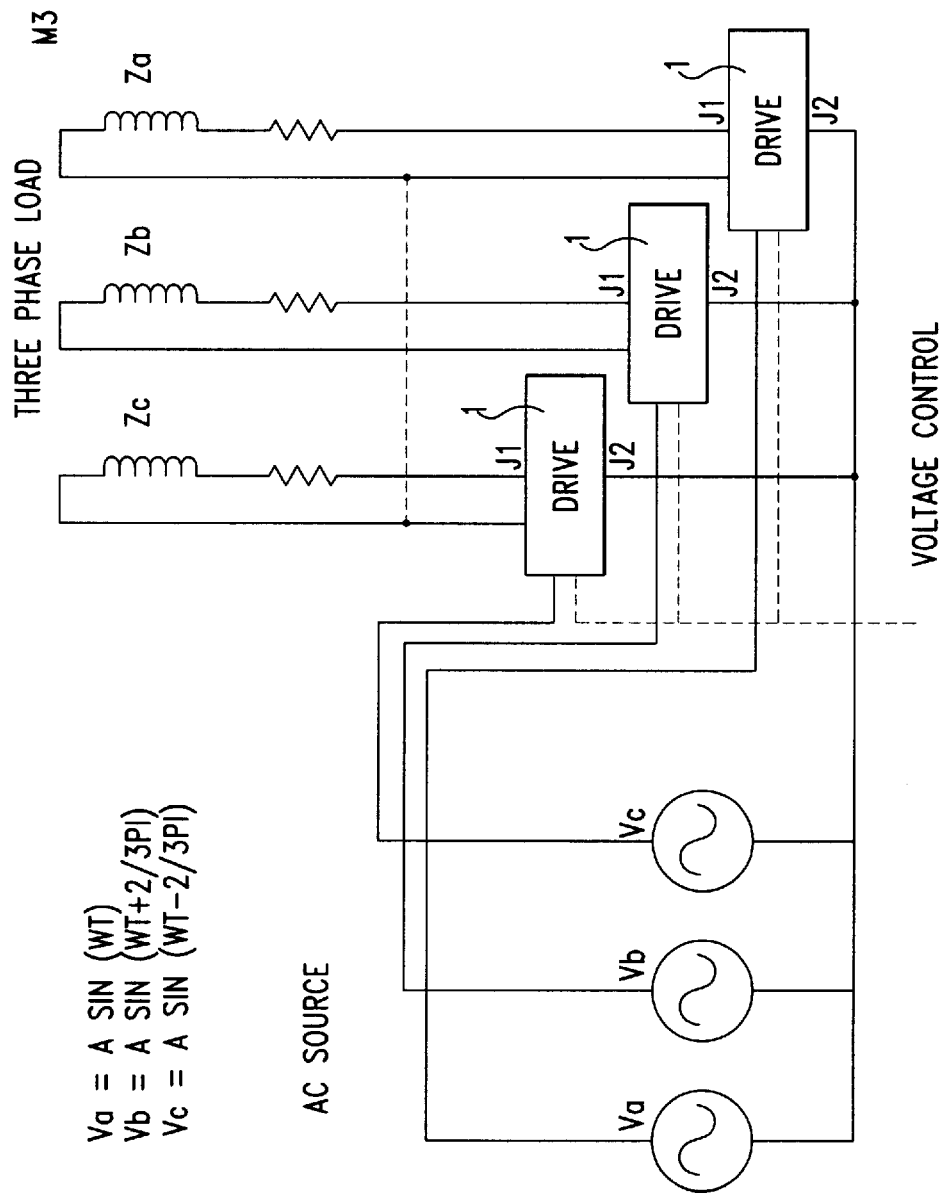
FIG. 7 is a schematic diagram illustrating an exemplary use of a set of devices according to embodiments of the invention for driving a three-phase electric load.

The devices can be readily adapted for driving three-phase electric loads, as shown schematically in FIG. 7. By using three identical drive devices 1 for each phase, the three discrete loads of a three-phase system M3 can be driven. The wiring diagram of FIG. 7 shows this clearly.

The circuit device 1 affords a number of advantages, foremost among which is that the electric load can be connected directly to the a.c. main supply. Furthermore, a single power switch device is employed, instead of a bridge of power devices as in the prior art. Also, the power regulation provided by this device is linear throughout the regulated range.

Additional advantages are the absence of torque pulses, and reduced current harmonics on the main compared to the regulation provided by the phase partialization method. The reduction in the harmonics obviously results in the vibrations from the physical structure of the motor being also reduced. Accordingly, the device of this invention can make the operation of electric motors effectively less noisy in many applications.

Finally, tests carried out by the Applicant have shown that a high level of efficiency can be attained by the drive system, with small overall losses. The easily implemented filter arrangement made possible by the high operating frequency, and the small number of components used, make the device of this invention attractive for many applications.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A circuit device for driving an a.c. electric load comprising:
   a rectifying bridge having a first input connected to one terminal of the electric load, and a second input connected to an outlet of an a.c. main supply, and the rectifying bridge having output terminals connected to a power switch which is controlled by an electric signal;
   first and second circuit loop-back links connected in parallel to the electric load, and being alternately activated by positive and negative half-waves of the a.c. main supply when the power switch is in an OFF state, wherein the first loop-back link comprises a first selection transistor and a first diode connected between input nodes of the electric load, the selection transistor having a control terminal and first and second conduction terminals; and
   a second diode non-switchably connected between the control terminal and the first conduction terminal of the selection transistor.

2. The device according to claim 1, wherein the first and second circuit loop-back links provide current loop-back that is bi-directional.

3. The device according to claim 1, wherein the second loop-back link comprises a second selection transistor and a third diode connected between the input nodes of the electric load.

4. The device according to claim 1, wherein the first selection transistor is an NPN bipolar transistor.

5. The device according to claim 1, wherein the second circuit loop-back link comprises a second selection transistor and a third diode connected between input nodes of the electric load.

6. The device according to claim 5, wherein the second selection transistor is a PNP bipolar transistor.

7. A circuit device for driving an a.c. electric load comprising:
   a rectifying bridge having a first input connected to one terminal of the electric load, and a second input connected to an outlet of an a.c. main supply, and the rectifying bridge having output terminals connected to a power switch which is controlled by an electric signal;
   first and second circuit loop-back links connected in parallel to the electric load, and being alternately activated by positive and negative half-waves of the a.c. main supply when the power switch is in an OFF state, wherein the first loop-back link comprises a selection transistor and a diode connected between input nodes of the electric load; and
   a double pair of diodes connected between a base and an emitter of the selection transistor.

8. The device according to claim 7, wherein the double pair of diodes connection forms an antiparallel configuration.

9. The device according to claim 7, further comprising a capacitor connected in parallel to said double pair of diodes.

10. An a.c. electric load driving circuit comprising:
    a first and a second source input terminal structured to accept an ac main supply signal;
    a bridge rectifier having a first and a second input terminal and a first and a second output terminal, the first input terminal coupled to the first source input terminal, the second input terminal coupled to a first load terminal of the a.c. electric load, the first output terminal coupled to a switch controlled by Pulse Width Modulation, and the second output terminal coupled to a ground reference; and
    a double loop-back circuit coupled between the second source input terminal and a second load terminal of the a.c. electric load, wherein the double loop-back circuit comprises:
    a first diode and a first selection transistor coupled in series between the first load terminal and the second load terminal of the a.c. electric load, the first selection transistor having a control terminal coupled to the second source input terminal; and
    a second diode and a second selection transistor coupled in series between the first load terminal and the second load terminal of the a.c. electric load, the second selection transistor having a control terminal coupled to the second source input terminal.

11. The driving circuit of claim 10, wherein the first selection transistor is an NPN bipolar transistor, and wherein the second selection transistor is a PNP bipolar transistor.

12. The driving circuit of claim 10 wherein the first and second selection transistors are bipolar transistors.

13. An a.c. electric load driving circuit comprising:
    a first and a second source input terminal structured to accept an ac main supply signal;

a bridge rectifier having a first and a second input terminal and a first and a second output terminal, the first input terminal coupled to the first source input terminal, the second input terminal coupled to a first load terminal of the a.c. electric load, the first output terminal coupled to a switch controlled by Pulse Width Modulation, and the second output terminal coupled to a ground reference;

a double loop-back circuit coupled between the second source input terminal and a second load terminal of the a.c. electric load;

a douple pair of diodes connected in an antiparallel configuration and having a first coupling terminal and a second coupling terminal, the first coupling terminal being coupled to a base terminal of both the first selection transistor and the second selection transistor, and the second coupling terminal being coupled to an emitter terminal of both the first selection transistor and the second selection transistor.

14. A method for driving an a.c. electric load comprising:

coupling the electric load directly to an a.c. power source when a pulse width modulation switch is in a first state;

when the pulse width modulation switch is in a second state, causing current to flow through a double-loop back circuit coupled in parallel to the electric load, the double-loop back circuit including first and second loop back links in parallel with each other;

sensing with a first rectifying element a current from the power source, the first rectifying element enabling the first loop back link and disabling the second loop back link when the current from the power source is flowing in a first direction; and sensing with a second rectifying element the current from the power source, the second rectifying element enabling the second loop back link and disabling the first loop back link when the current from the power source is flowing in the second direction.

15. The method of claim 14 wherein the first rectifying element includes a first pair of diodes and the second rectifying element includes a second pair of diodes.

16. A driving circuit for driving an ac electric load, comprising:

first and second source input terminals structured to accept an ac main supply signal;

a bridge rectifier having first and second input terminals and an output terminal, the first input terminal coupled to the first source input terminal; and a double loop-back circuit coupled in parallel with the ac electric load, the double loop-back circuit including:

a first diode and a first selection transistor coupled in series between a first load terminal and a second load terminal of the ac electric load, the first selection transistor having a control terminal coupled to the second source input terminal; and a second diode and a second selection transistor coupled in series between the first load terminal and the second load terminal of the a.c. electric load, the second selection transistor having a control terminal coupled to the first input terminal of the bridge rectifier.

17. The driving circuit of claim 16, further comprising:

a first rectifying element coupled between the control terminal of the first selection transistor and a conduction terminal of the first selection transistor; and a second rectifying element coupled between the control terminal of the second selection transistor and a conduction terminal of the second selection transistor.

18. The driving circuit of claim 17, further comprising:

a first capacitive element coupled in parallel with the first rectifying element; and a second capacitor element coupled in parallel with the second rectifying element.

19. The driving circuit of claim 16, further comprising a power transistor coupled between the output terminal of the bridge rectifier and a ground reference.

* * * * *

UNITED STATES PATENT AND TRADEMARK OFFICE
CERTIFICATE OF CORRECTION

PATENT NO.    : 6,256,211 B1
DATED         : July 3, 2001
INVENTOR(S)   : Antonino Milazzotto et al.

It is certified that error appears in the above-identified patent and that said Letters Patent is hereby corrected as shown below:

<u>Column 6, claim 10,</u>
Line 44, "output terninal" should read as -- output terminal --

Signed and Sealed this

Ninth Day of April, 2002

Attest:

JAMES E. ROGAN
*Attesting Officer*       *Director of the United States Patent and Trademark Office*